United States Patent
Avitan

(10) Patent No.: US 10,305,541 B2
(45) Date of Patent: May 28, 2019

(54) REDUCTION OF FAR-END CROSSTALK IN HIGH-SPEED SINGLE-ENDED RECEIVERS

(71) Applicant: Marvell World Trade Ltd., St. Michael (BB)

(72) Inventor: Shimon Avitan, Tal-El (IL)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/697,464

(22) Filed: Sep. 7, 2017

(65) Prior Publication Data

US 2018/0076852 A1 Mar. 15, 2018

Related U.S. Application Data

(60) Provisional application No. 62/385,644, filed on Sep. 9, 2016.

(51) Int. Cl.
  H04B 1/10 (2006.01)
  H04B 3/32 (2006.01)
  H04B 1/16 (2006.01)

(52) U.S. Cl.
  CPC ............. H04B 3/32 (2013.01); H04B 1/16 (2013.01)

(58) Field of Classification Search
  CPC .................................... H04B 3/32; H04B 1/16
  USPC ....... 375/349, 219, 226, 227, 229, 295, 296; 370/201, 463; 455/24, 78, 295, 296, 571
  See application file for complete search history.

(56) References Cited

U.S. PATENT DOCUMENTS

| | | | | |
|---|---|---|---|---|
| 5,509,078 | A | * | 4/1996 | Hiraoka ............... H03F 3/68 330/124 R |
| 2006/0197697 | A1 | * | 9/2006 | Nagata ............. G01R 31/2884 342/22 |
| 2007/0047733 | A1 | * | 3/2007 | Bremer ................. H04M 1/76 379/416 |
| 2015/0046891 | A1 | * | 2/2015 | Feldmann .......... G06F 17/5036 716/115 |
| 2016/0119024 | A1 | * | 4/2016 | Muljono ................ H04B 3/32 370/201 |

* cited by examiner

*Primary Examiner* — Dhaval V Patel

(57) ABSTRACT

A receiver circuit includes a source-follower input stage and a far-end crosstalk (FEXT) reduction circuit. The source-follower input stage is configured to receive a first signal over a first transmission line. The FEXT reduction circuit is coupled to the source-follower input stage and is configured to derive, from a second signal on a second transmission line, an approximated FEXT signal that approximates an interfering signal induced in the first transmission line by the second signal, and reduce a level of the interfering signal by combining the approximated FEXT signal and the first signal.

15 Claims, 4 Drawing Sheets

REDUCTION OF FAR-END CROSSTALK IN HIGH-SPEED SINGLE-ENDED RECEIVERS

CROSS-REFERENCE TO RELATED APPLICATIONS

This application claims the benefit of U.S. Provisional Patent Application 62/385,644, filed Sep. 9, 2016, whose disclosure is incorporated herein by reference.

FIELD OF THE DISCLOSURE

The present disclosure relates generally to interference mitigation in electronic circuitry, and particularly to methods and systems for reduction of far-end crosstalk (FEXT).

BACKGROUND

Transmission lines that carry electrical signals are often subject to crosstalk. One example type of crosstalk is inductive far-end crosstalk (FEXT), which is caused by inductive coupling of a signal from one transmission line to another. FEXT may be detrimental to signal integrity, particularly for high-speed signals.

The description above is presented as a general overview of related art in this field and should not be construed as an admission that any of the information it contains constitutes prior art against the present patent application.

SUMMARY

An embodiment that is described herein provides a receiver circuit including a source-follower input stage and a far-end crosstalk (FEXT) reduction circuit. The source-follower input stage is configured to receive a first signal over a first transmission line. The FEXT reduction circuit is coupled to the source-follower input stage and is configured to derive, from a second signal on a second transmission line, an approximated FEXT signal that approximates an interfering signal induced in the first transmission line by the second signal, and reduce a level of the interfering signal by combining the approximated FEXT signal and the first signal.

In an embodiment, the FEXT reduction circuit is configured to derive the approximated FEXT signal by generating a derivative of the second signal with respect to time. In an example embodiment, the FEXT reduction circuit is configured to generate the approximated FEXT signal by high-pass filtering the second signal. In a disclosed embodiment, the FEXT reduction circuit includes a capacitor coupled to a voltage divider of the source-follower input stage.

In some embodiments, the FEXT reduction circuit is configured to derive, from multiple second signals on multiple second transmission lines, a composite approximated FEXT signal that approximates the interfering signal induced in the first transmission line by the multiple second signals, and to combine the composite approximated FEXT signal and the first signal so as to reduce the level of the interfering signal induced by the multiple second signals. In a disclosed embodiment, the FEXT reduction circuit includes multiple capacitors that are coupled respectively to the multiple second transmission lines, and are all connected to a voltage divider of the source-follower input stage.

In some embodiments, the receiver further includes calibration circuitry, which is configured to measure the level of the interfering signal in the combined approximated FEXT signal and first signal, and to tune the FEXT reduction circuit to reduce the level. In an example embodiment, the FEXT reduction circuit is configured to derive the approximated FEXT signal using one or more variable capacitors, and the calibration circuitry is configured to reduce the level of the interfering signal by controlling the one or more variable capacitors. In an embodiment, the first transmission line and the second transmission line are part of a communication bus.

There is additionally provided, in accordance with an embodiment that is described herein, a method for signal reception, including receiving a first signal over a first transmission line by a source-follower input stage. An approximated far-end crosstalk (FEXT) signal, which approximates an interfering signal induced in the first transmission line by a second signal on a second transmission line, is derived from the second signal. A level of the interfering signal is reduced by combining the approximated FEXT signal and the first signal.

The present disclosure will be more fully understood from the following detailed description of the embodiments thereof, taken together with the drawings in which:

DETAILED DESCRIPTION OF EMBODIMENTS

Figure 1:
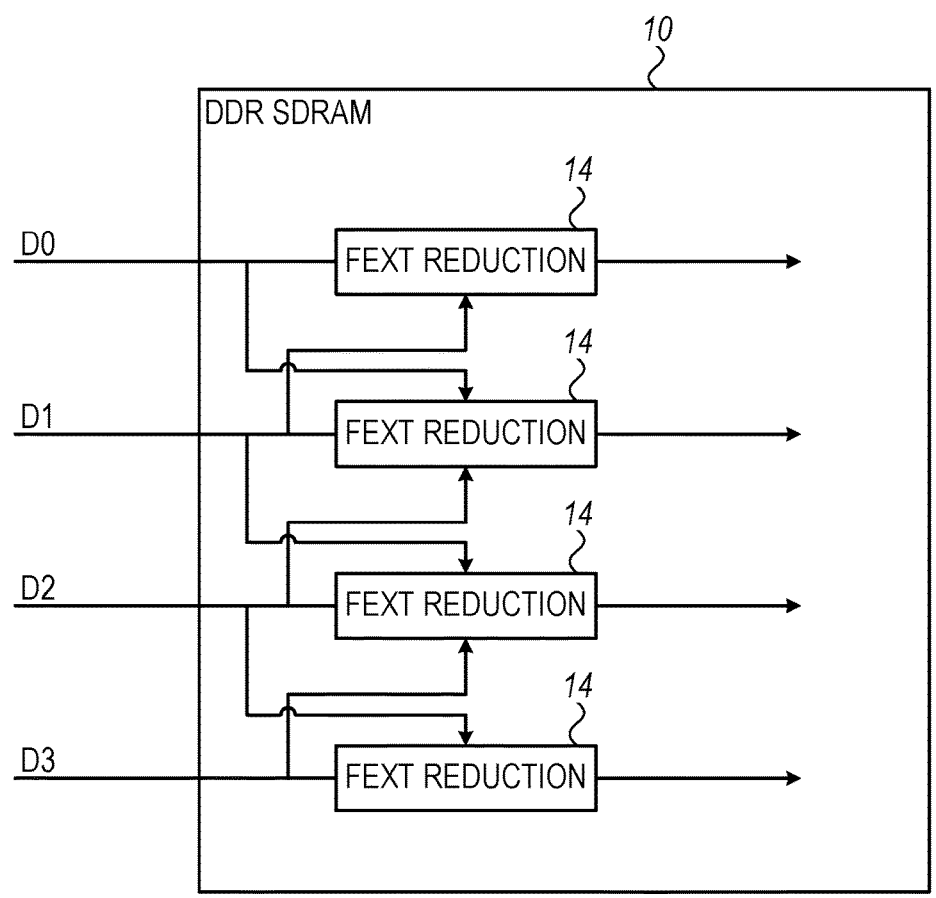
FIG. 1 is a block diagram that schematically illustrates a memory device comprising far-end crosstalk (FEXT) reduction circuits, in accordance with an embodiment that is described herein.

Embodiments that are described herein provide improved methods and circuits for reducing far-end crosstalk (FEXT). The embodiments described herein refer mainly to reduction of FEXT between input lines of a bus in an Integrated Circuit (IC). The disclosed techniques, however, are not limited to this example use-case, and are useful for reducing FEXT between any other suitable transmission lines.

In some embodiments, a receiver is configured to receive a first signal over a first transmission line. The receiver in these embodiments is a single-ended receiver comprising a source-follower input amplification stage. A second signal, on a second transmission line, induces an interfering signal in the first transmission line due to FEXT. The first and second transmission lines are referred to herein as "victim" and "aggressor," respectively.

The receiver further comprises a FEXT reduction circuit, which is coupled to the source-follower input stage and is configured to reduce the level of the interfering signal. The FEXT reduction circuit derives from the second signal (the aggressor signal on the second transmission line) an approximated FEXT signal, which approximates the interfering signal induced by the second signal in the first transmission line (the victim line). The FEXT reduction circuit reduces the level of the interfering signal on the victim line by combining the approximated FEXT signal and the first signal.

In an example embodiment, the source-follower input stage of the receiver comprises a transistor having a resistor voltage divider between its source and ground. The output of the source-follower stage is taken from the middle junction of the voltage divider. The FEXT reduction circuit comprises a capacitor connected between this middle junction and the aggressor line. The capacitor and voltage divider together form a differentiator circuit, which derives the approximated FEXT signal by generating a time-derivative of the second signal, in an embodiment. The operation of this differentiator circuit can also be viewed as high-pass filtering the second signal. The approximated FEXT signal is combined with the first signal at the middle junction of the voltage divider. The combined signal, having a reduced FEXT level, is provided to subsequent stages of the receiver.

Another embodiment provides a generalization of the above circuit for the case of multiple aggressor lines that induce FEXT in the same victim line. In this embodiment, the FEXT reduction circuit comprises a separate capacitor connected to each aggressor line. The capacitors are all connected to the middle of the source-follower voltage divider. In some embodiments, the capacitors are variable, and their values are tuned so as to reduce the composite FEXT signal induced from the multiple aggressor lines. An example calibration procedure is also provided herein.

The methods and circuits described herein provide an effective yet simple and low-cost way to reduce FEXT. The disclosed FEXT reduction circuits have a very low parts count, in an embodiment, e.g., because they re-use the existing voltage divider of the receiver's source-follower input stage, in an embodiment. The disclosed solutions thus lend themselves, for instance, to implementation in high-speed applications having multi-aggressor FEXT, such as data and address communication buses of Double Data Rate Synchronous Dynamic Random-Access Memory (DDR SDRAM) devices.

In one embodiment of this sort, each line of the bus is fitted with a receiver having a FEXT reduction circuit, which reduces FEXT originating from one or more other lines of the bus. In other words, each line serves both as a victim line whose receiver reduces FEXT from one or more (typically neighboring) aggressor lines, and as an aggressor line that causes FEXT to one or more (typically neighboring) victim lines.

FIG. 1 is a block diagram that schematically illustrates a memory device 10 comprising far-end crosstalk (FEXT) reduction circuits 14, in accordance with an embodiment that is described herein. An example circuit configuration for implementing FEXT reduction circuits 14 is described below and depicted in FIG. 4.

In the present example, memory device 10 comprises a Double Data Rate Synchronous Dynamic Random-Access Memory (DDR SDRAM) device. In alternative embodiments, however, the disclosed circuits and associated methods are applicable in a wide variety of electronic devices, e.g., other types of memory devices, and network devices such as packet switches, or in any other suitable electronic device.

In the present example, memory device 10 comprises a bus comprising multiple input lines. The figure shows four lines denoted D0, . . . , D3, solely by way of example. In alternative embodiments, the bus may comprise any other suitable number of input lines. Each of lines D0, . . . , D3 is coupled to a respective FEXT reduction circuit 14, which reduces the FEXT originating from one or more other lines of the bus.

In the example of FIG. 1, FEXT reduction circuit 14 of line D0 reduces the FEXT originating from line D1, FEXT reduction circuit 14 of line D1 reduces the FEXT originating from lines D0 and D2, FEXT reduction circuit 14 of line D2 reduces the FEXT originating from lines D1 and D3, and FEXT reduction circuit 14 of line D3 reduces the FEXT originating from line D2. This choice of aggressor lines, however, is a design choice and can be made in any other suitable way. Any FEXT reduction circuit 14 may receive as input the signals from any other suitable set of one or more aggressor lines, and reduce the FEXT originating from these lines. The aggressor lines need not necessarily be neighbors of the victim line in the bus.

Figure 2:
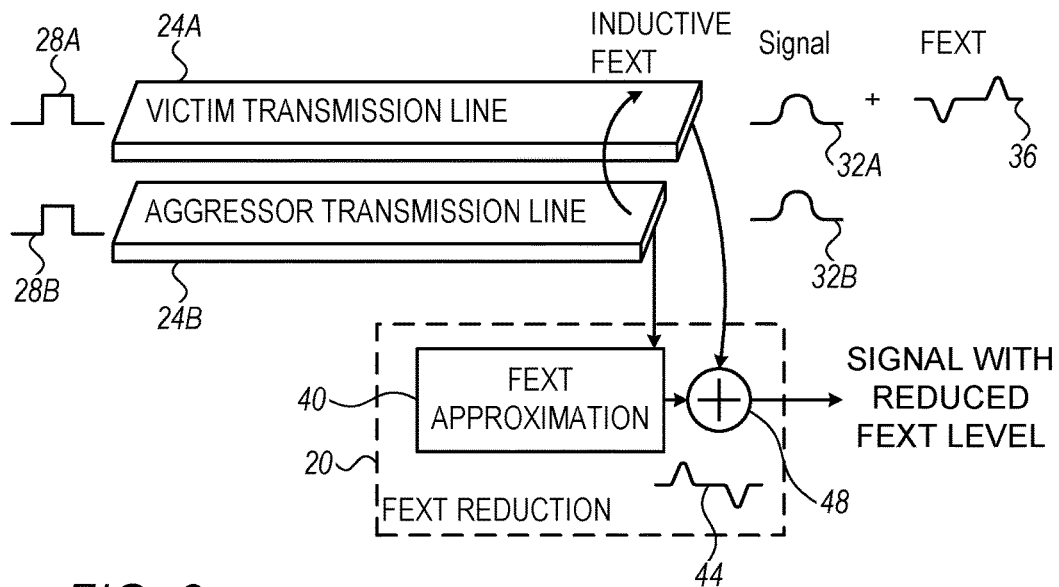
FIG. 2 is a block diagram that schematically illustrates a FEXT reduction circuit, in accordance with an embodiment that is described herein.
Figure 3:
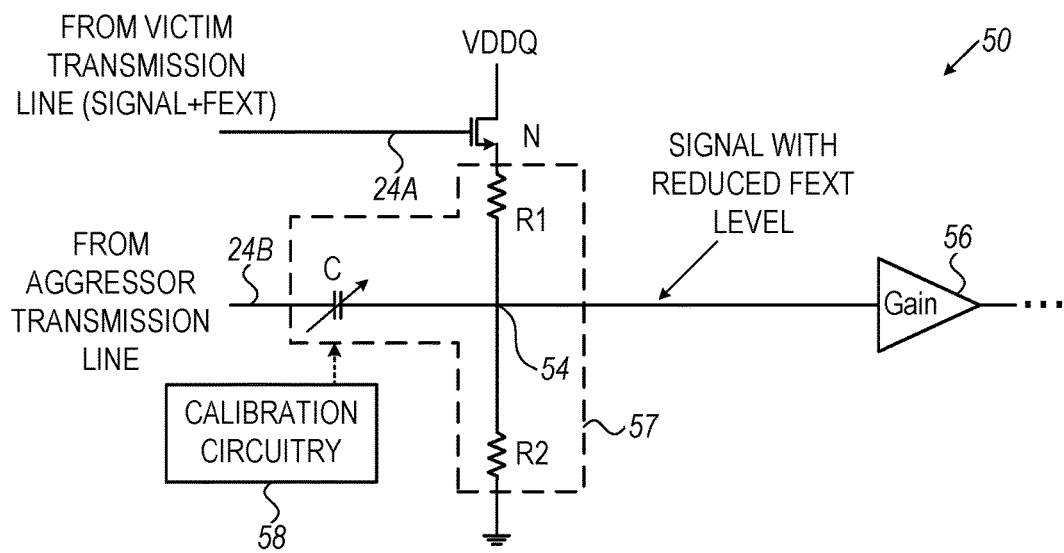
FIGS. 3 and 4 are circuit diagrams that schematically illustrate single-ended receivers comprising a FEXT reduction circuits, in accordance with embodiments that are described herein.
Figure 4:
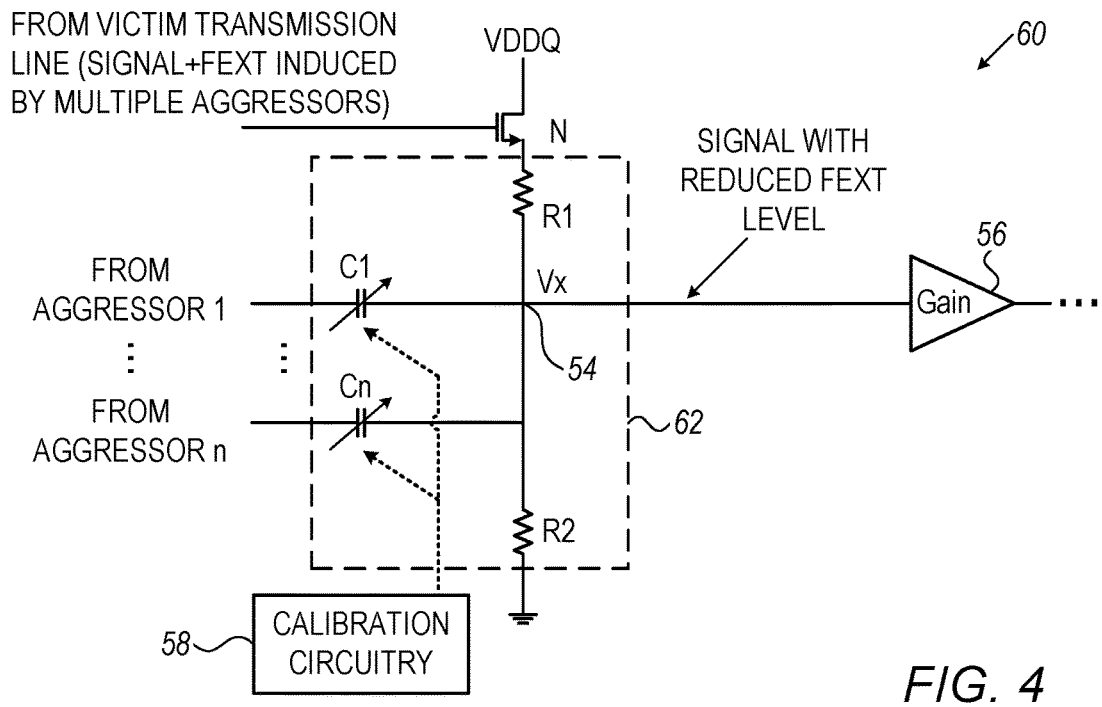

FIG. 2 is a block diagram that schematically illustrates a far-end crosstalk (FEXT) reduction circuit 20, in accordance with an embodiment that is described herein. FEXT reduction circuit 20 typically is used for reducing FEXT at the input of a line receiver. Example implementations, in which the disclosed FEXT reduction circuit is integrated with a source-follower input amplification stage of a single-ended receiver, are shown in FIGS. 3 and 4 below.

In the present example, FEXT reduction circuit 20 is part of a receiver of a first transmission line 24A, referred to as a "victim." The receiver is configured to receive a first signal 28A on the victim line. A second signal 28B on a second transmission line 24B, referred to as an "aggressor," induces an interfering signal in the victim line due to inductive FEXT. As can be seen in the figure, two signals are present at the far end of the victim line—a first far-end signal 32A and an interfering signal 36 caused by the FEXT.

Interfering signal 36 is caused by inductive coupling of a second far-end signal 28B at the far end of aggressor line 24B. Therefore, interfering signal 36 can be approximated by the derivative (differential) of far-end signal 28B with respect to time. This approximation is used in the design of FEXT reduction circuit 20, as will be explained below.

In some embodiments, FEXT reduction circuit 20 comprises a FEXT approximation circuit 40, which receives second far-end signal 32B from aggressor line 24B and derives from this signal an approximated FEXT signal 44. FEXT reduction circuit 20 further comprises a combiner 48, which receives first far-end signal 32A from victim line 24A and combines this signal with approximated FEXT signal 44. Combining the two signals effectively subtracts an estimate of the FEXT signal from the signal on the victim line. The combined signal at the output of combiner 48 thus has a considerably reduced level of the interfering signal (in comparison with the level of the interfering signal on victim line 24A).

In the context of the present disclosure and in the claims, the term "approximated FEXT signal" refers both to approximated signals having the same polarity as the interfering signal, and to approximated signals having inverse polarity relative to the interfering signal. By the same token, the term "combining" may refer to addition (summation) or subtraction, as appropriate. When the approximated FEXT signal has the same polarity as the interfering signal, combining the two signals comprises subtracting one signal from the other signal. When the approximated FEXT signal has an inverse polarity relative to the interfering signal, combining the two signals comprises summing the signals.

FIG. 3 is a circuit diagram that schematically illustrates a single-ended receiver 50 comprising a FEXT reduction circuit 57, in accordance with an embodiment that is described herein. In the embodiment of FIG. 3, the principles of receiver 20 described above are integrated in a single-ended receiver having a source-follower input amplification stage. In this embodiment, victim line 24A is connected to the gate of a transistor denoted N, in the present example an N-type Metal-Oxide-Semiconductor (NMOS) Field-Effect Transistor (FET). The drain of transistor N is connected to a supply voltage denoted VDDQ. A voltage divider, formed by two resistors R1 and R2, is connected between the source of transistor N and ground, in an embodiment.

The output of the source-follower input stage is taken from a middle junction 54 of the voltage divider. The output is provided to a gain stage 56, and then to subsequent stages of receiver 50 (not shown in the figure) that extract the signal.

In the embodiment of FIG. 3, a FEXT approximation circuit 57 is formed from resistors R1 and R2, and a capacitor C. One side of capacitor C is connected to aggressor line 24B, and the other side of capacitor C is connected to middle junction 54 of the voltage divider. FEXT approximation circuit 57 receives the far-end signal from aggressor line 24B, and generates an approximated FEXT signal at junction 54.

FEXT approximation circuit 57, comprising the network of capacitor C and resistors R1 and R2, functions as a differentiator that differentiates (generates the time-derivative of) the far-end signal of the aggressor line. This derivative signal serves as the approximated FEXT signal. The network of capacitor C and resistors R1 and R2 (FEXT approximation circuit 57) can also be viewed as implementing a High-Pass Filter (HPF) that filters the far-end signal of the aggressor line and outputs the approximated FEXT signal. In alternative embodiments, other suitable circuits that implement a HPF or differentiator can be used.

In this implementation, junction 54 also serves as a combiner that combines the approximated FEXT signal with the far-end signal of victim line 24A. The signal at junction 54 has a considerably higher signal-to-interference ratio (ratio between the desired far-end signal of victim line 24A and the interfering signal induced from aggressor line 24B) than the signal at the gate of transistor N.

In some embodiments, capacitor C is variable, and receiver 50 comprises calibration circuitry that is configured to adjust the capacitance of capacitor C to achieve maximal FEXT reduction. An example calibration procedure, and related calibration considerations, are discussed further below with reference to FIG. 5.

In an example embodiment, capacitor C comprises a bank of two or more capacitors connected in parallel to one another via respective switches (not seen). Each of the capacitors can be switched-in or switched-out of the bank by the respective switch. The switches are controlled by calibration circuitry 58. By switching-in the appropriate subset of capacitors, calibration circuitry 58 can selectively set the total capacitance of C to the preferred value.

In an example embodiment, the capacitances of the individual capacitors in the bank are binary multiples of some basic capacitance unit c, i.e., $\{c, 2 \cdot c, 4 \cdot c, 8 \cdot c, \ldots, 2^{n-1} \cdot c\}$. This choice provides total capacitance values between c and $2^n \cdot c - 1$ with a resolution of c. In alternative embodiments, variable capacitor C can be implemented in any other suitable way. In yet other embodiments, capacitor C has a fixed capacitance.

The examples of FIGS. 2 and 3 above refer to the case of FEXT induced from a single aggressor line, for the sake of clarity. In many practical scenarios, however, a given victim line is subject to FEXT from multiple aggressor lines. The embodiments described below address these scenarios.

FIG. 4 is a circuit diagram that schematically illustrates a single-ended receiver 60 comprising a FEXT reduction circuit 62, in accordance with an alternative embodiment that is described herein. This embodiment is useful, for example, when the victim line is subject to non-negligible FEXT from two or more aggressor lines.

In the embodiment of FIG. 4, FEXT approximation circuit 62 comprises multiple capacitors C1 . . . Cn, and resistors R1 and R2, in an embodiment. Each capacitor is connected to a respective aggressor line, and to middle junction 54 of the voltage divider of the source-follower input stage. FEXT approximation circuit 62 generates a composite approximated FEXT signal, which approximates the composite interfering signal that is induced in the victim line by the multiple aggressor lines.

Junction 54 in this example serves as a combiner that combines the composite approximated FEXT signal with the far-end signal of the victim line. With proper approximation and combining, the output signal (denoted Vx) has a considerably higher signal-to-interference ratio (ratio between the desired far-end signal of the victim line and the interfering signals induced from the aggressor lines) than the signal at the gate of transistor N.

In some embodiments, the capacitances of capacitors C1 . . . Cn are variable and controlled by calibration circuitry 58. In practice, it is quite possible that different aggressor lines will affect the victim line differently. For example, the coupling ratio between an aggressor line and the victim line will typically decrease with the distance between the two lines. Thus, the optimal capacitance of capacitor Ck (which achieves best approximation of the interfering signal and therefore best FEXT reduction) may differ from one aggressor line to another.

The configurations of receivers 50 and 60, FEXT approximation circuit 40 and FEXT reduction circuits 14, 20, 57 and 62, shown in FIGS. 1-4 are example configurations that are depicted solely for the sake of clarity. In alternative embodiments, any other suitable configurations can be used. Circuit elements that are not mandatory for understanding of the disclosed techniques have been omitted from the figures for the sake of clarity.

The different elements of the disclosed receivers, FEXT approximation circuits and FEXT reduction circuits may be implemented using dedicated hardware or firmware, such as using hard-wired or programmable logic, e.g., in an Application-Specific Integrated Circuit (ASICs) or Field-Programmable Gate Array (FPGA). Some elements, for example calibration circuitry 58, may be implemented using software, or using a combination of hardware, software and/or firmware elements.

As noted above with respect to FIG. 1, in an embodiment, the disclosed techniques are used for reducing FEXT in multiple lines of a bus of a DDR SDRAM device. In such an embodiment, each line of the bus is fitted with a receiver such as receiver 50 of FIG. 3 or receiver 60 of FIG. 4. The number of aggressor lines handled by each receiver is a design choice. Example typical values are between one and four aggressor lines, but any other suitable number can be used. A receiver that handles only the (one or two) immediate-neighbor aggressor lines is, for example, relatively simple to implement. In this embodiment, each line of the bus plays both the role of a victim line whose receiver reduces FEXT from one or more (typically neighboring) aggressor lines, and the role of an aggressor line that causes FEXT to one or more (typically neighboring) victim lines.

Figure 5:
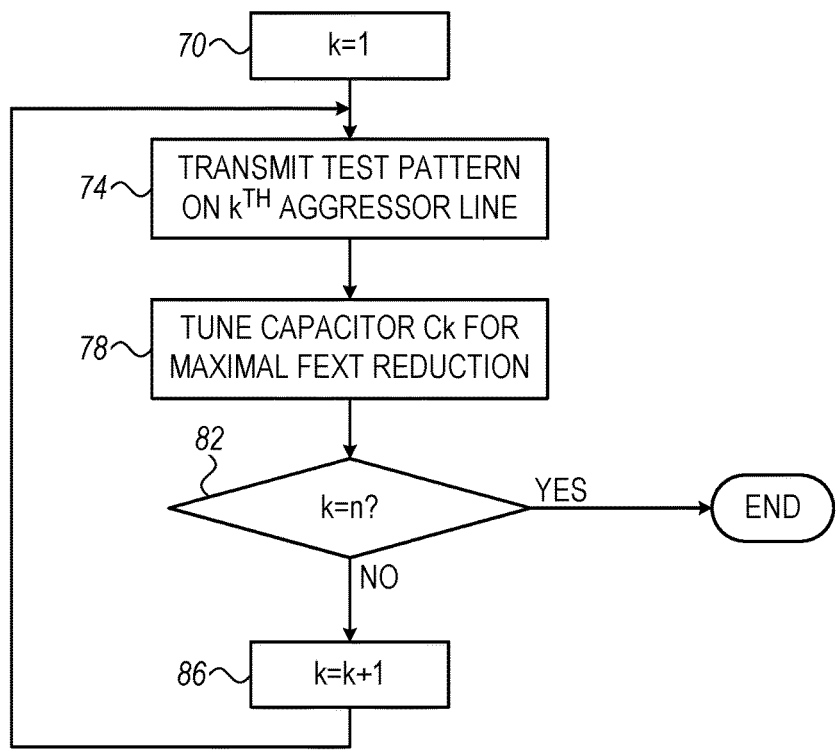
FIG. 5 is a flow chart that schematically illustrates a method for calibrating a FEXT reduction circuit, in accordance with an embodiment that is described herein.

FIG. 5 is a flow chart that schematically illustrates an example method for calibrating the FEXT reduction circuit of receiver 60 in FIG. 4, in accordance with an embodiment that is described herein. The method begins with calibration circuitry 58 initializing the index of the capacitor being adjusted to k=1, at an initialization operation 70.

At a pattern transmission operation 74, calibration circuitry 58 transmits a predefined test pattern on the $k^{th}$ aggressor line. No signals are typically transmitted on the victim line and on the other aggressor lines. The test pattern typically comprises a signal that is known to cause severe FEXT.

At a tuning operation 78, calibration circuitry 58 sets Ck, i.e., the capacitor of the $k^{th}$ aggressor line, to the capacitance that achieves best FEXT reduction on the victim line. In an example embodiment, calibration circuitry 58 senses the signal on the victim line, which in the absence of other signals comprises only the interfering signal induced from the $k^{th}$ aggressor line. Calibration circuitry 58 adjusts the capacitance of Ck until achieving minimal signal level on the victim line.

At a checking operation 82, calibration circuitry 58 checks whether k=n, i.e., whether all n capacitors of all n aggressor lines have been tuned. If so, the method terminates. If not, calibration circuitry increments k, at an incrementing operation 86, and the method loops back to operation 74 above for tuning the next capacitor.

The method of FIG. 5 refers to the receiver of a given line, playing the role of a victim line. In embodiments having multiple victim lines, e.g., in the case of a bus, the method is typically carried out separately per victim line. In embodiments having multiple victim lines, a single calibration circuitry 58 typically performs calibration of all victim lines. In other words, there is typically no need to duplicate the calibration circuitry per receiver.

In various embodiments, the calibration procedure of FIG. 5 is carried out at various times or in response to various events. In one embodiment, the calibration procedure is performed only once during manufacturing. In another embodiment, the calibration procedure is performed every time the receiver is powered-up. Alternatively, any other calibration policy can be used, e.g., periodic calibration or calibration in response to changes in voltage or temperature.

Figure 6:
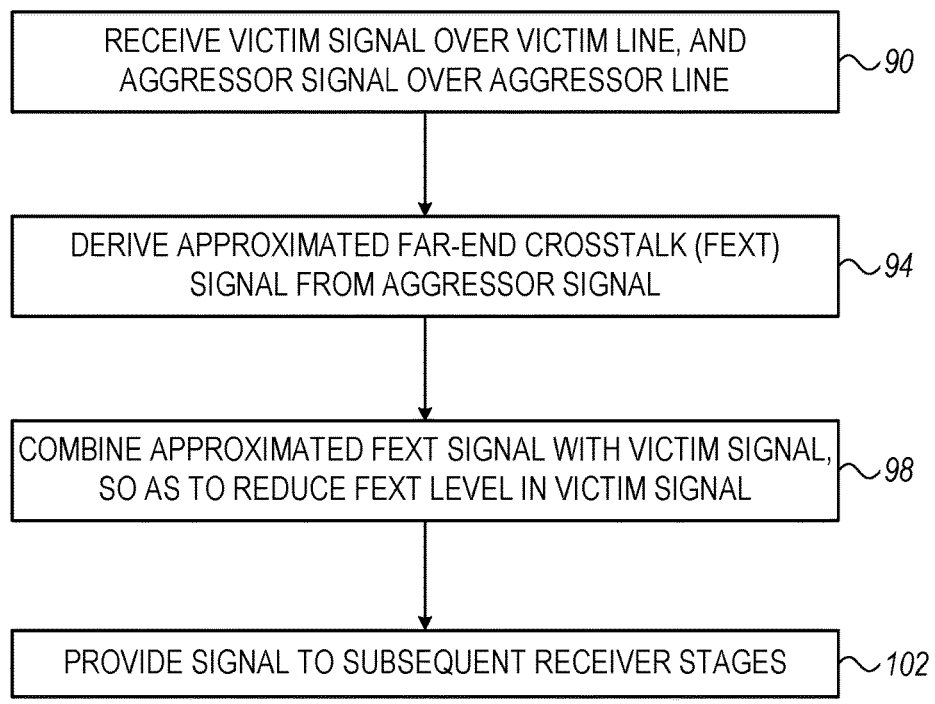
FIG. 6 is a flow chart that schematically illustrates a method for reducing FEXT, in accordance with an embodiment that is described herein.

FIG. 6 is a flow chart that schematically illustrates a method for reducing FEXT, in accordance with an embodiment that is described herein. The method is described with reference to FEXT reduction circuit 20 of FIG. 2, by way of example. The method begins with FEXT reduction circuit 20 receiving a victim signal over a victim line, and an aggressor signal over an aggressor line, at a signal reception operation 90. At a FEXT approximation operation 94, FEXT approximation circuit 40 derives an approximated FEXT signal from the aggressor signal. At a combining operation 98, combiner 48 combines the approximated FEXT signal with the victim signal. At an output operation 102, FEXT reduction circuit 20 provides the resulting victim signal, having a reduced FEXT level, to subsequent receiver stages.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A receiver circuit, comprising:
   a source-follower input stage, which is configured to receive a first signal over a first transmission line; and
   a far-end crosstalk (FEXT) reduction circuit, which is coupled to the source-follower input stage and is configured to:
      derive, from a second signal on a second transmission line, before the second signal is amplified, an approximated FEXT signal that approximates an interfering signal induced in the first transmission line by the second signal; and
      before the first signal is amplified, reduce a level of the interfering signal by combining the approximated FEXT signal and the first signal; and
   a gain stage, configured to amplify the first signal in which the level of the interfering signal has been reduced by the FEXT reduction circuit.

2. The receiver circuit according to claim 1, wherein the FEXT reduction circuit is configured to derive the approximated FEXT signal by generating a derivative of the second signal with respect to time.

3. The receiver circuit according to claim 1, wherein the FEXT reduction circuit is configured to generate the approximated FEXT signal by high-pass filtering the second signal.

4. The receiver circuit according to claim 1, wherein the FEXT reduction circuit comprises a capacitor coupled to a voltage divider of the source-follower input stage.

5. The receiver circuit according to claim 1, wherein the FEXT reduction circuit is configured to:
   derive, from multiple second signals on multiple second transmission lines, a composite approximated FEXT signal that approximates the interfering signal induced in the first transmission line by the multiple second signals; and
   combine the composite approximated FEXT signal and the first signal so as to reduce the level of the interfering signal induced by the multiple second signals.

6. The receiver circuit according to claim 5, wherein the FEXT reduction circuit comprises multiple capacitors that are coupled respectively to the multiple second transmission lines, and are all connected to a voltage divider of the source-follower input stage.

7. The receiver circuit according to claim 1, further comprising calibration circuitry, configured to measure the level of the interfering signal in the combined approximated FEXT signal and first signal, and to tune the FEXT reduction circuit to reduce the level.

8. The receiver circuit according to claim 7, wherein the FEXT reduction circuit is configured to derive the approximated FEXT signal using one or more variable capacitors, and wherein the calibration circuitry is configured to reduce the level of the interfering signal by controlling the one or more variable capacitors.

9. The receiver circuit according to claim 1, wherein the first transmission line and the second transmission line are part of a communication bus.

10. A method for signal reception, comprising:
    receiving a first signal over a first transmission line by a source-follower input stage;

deriving, from a second signal on a second transmission line, before the second signal is amplified, an approximated far-end crosstalk (FEXT) signal that approximates an interfering signal induced in the first transmission line by the second signal;

before the first signal is amplified, reducing a level of the interfering signal by combining the approximated FEXT signal and the first signal; and amplifying the first signal, in which the level of the interfering signal has been reduced by the FEXT reduction circuit.

11. The method according to claim 10, wherein deriving the approximated FEXT signal comprises generating a derivative of the second signal with respect to time.

12. The method according to claim 10, wherein deriving the approximated FEXT signal comprises high-pass filtering the second signal.

13. The method according to claim 10,
wherein deriving the approximated FEXT signal comprises deriving, from multiple second signals on multiple second transmission lines, a composite approximated FEXT signal that approximates the interfering signal induced in the first transmission line by the multiple second signals; and wherein combining the approximated FEXT signal and the first signal comprises combining the composite approximated FEXT signal and the first signal so as to reduce the level of the interfering signal induced by the multiple second signals.

14. The method according to claim 10, further comprising measuring the level of the interfering signal in the combined approximated FEXT signal and first signal, and tuning the FEXT reduction circuit to reduce the level.

15. The method according to claim 14, wherein deriving the approximated FEXT signal comprises deriving the approximated FEXT signal using one or more variable capacitors, and wherein tuning the FEXT reduction circuit comprises reducing the level of the interfering signal by controlling the one or more variable capacitors.

* * * * *